United States Patent
Edwards

(10) Patent No.: US 7,213,843 B2
(45) Date of Patent: May 8, 2007

(54) SPLASHGUARD

(75) Inventor: Jerry A. Edwards, 5602 NE. Skyport Way, Portland, OR (US) 97218

(73) Assignee: Jerry A. Edwards, Portland, OR (US)

(*) Notice: Subject to any disclaimer, the term of this patent is extended or adjusted under 35 U.S.C. 154(b) by 0 days.

(21) Appl. No.: 11/155,211

(22) Filed: Jun. 16, 2005

(65) Prior Publication Data

US 2006/0284408 A1 Dec. 21, 2006

(51) Int. Cl.
*B62B 9/14* (2006.01)

(52) U.S. Cl. .................. 280/851; 280/847; 280/848; 280/154

(58) Field of Classification Search ............. 280/851, 280/847, 152.2, 152.3, 848, 154, 159
See application file for complete search history.

(56) References Cited

U.S. PATENT DOCUMENTS

| | | | | |
|---|---|---|---|---|
| 2,699,955 A | * | 1/1955 | Eaves et al. ............... | 280/851 |
| 3,051,508 A | * | 8/1962 | Federspiel ................. | 280/851 |
| 4,709,938 A | * | 12/1987 | Ward et al. ............... | 280/851 |
| 5,839,761 A | * | 11/1998 | Dodt ........................ | 280/851 |
| D406,087 S | * | 2/1999 | Bavington et al. ......... | D12/185 |
| 6,076,842 A | * | 6/2000 | Knoer ....................... | 280/154 |
| 6,729,652 B2 | * | 5/2004 | Cicansky ................... | 280/847 |
| 6,827,372 B2 | * | 12/2004 | Barr et al. ................ | 280/847 |
| 6,938,930 B1 | * | 9/2005 | Beach ....................... | 280/851 |
| 7,066,493 B2 | * | 6/2006 | Cicansky ................... | 280/848 |
| 2003/0151243 A1 | * | 8/2003 | Horinek .................... | 280/848 |
| 2004/0066028 A1 | * | 4/2004 | Edwards ................... | 280/851 |
| 2004/0140663 A1 | * | 7/2004 | Barr et al. ................ | 280/847 |

* cited by examiner

*Primary Examiner*—J. Allen Shriver
(74) *Attorney, Agent, or Firm*—Ian F. Burns & Associates; Ian F. Burns

(57) ABSTRACT

Certain embodiments of the present invention comprises a splashguard for use in controlling tire splashes of a vehicle. The splashguard comprises a main plate that is attachable to a vehicle. The main plate has a top and bottom. An insert is attached to the bottom of the main plate. The insert is adapted to protect the plate from abrasion and wear. A hanger is mounted to the top of the first plate. The splashguard further comprises a method of creating a splashguard that comprises providing a hanger and molding a plate around a portion of the hanger. An insert is attached to the plate. The insert and the plate form a splashguard assembly that is attached to the vehicle through the hanger.

15 Claims, 6 Drawing Sheets

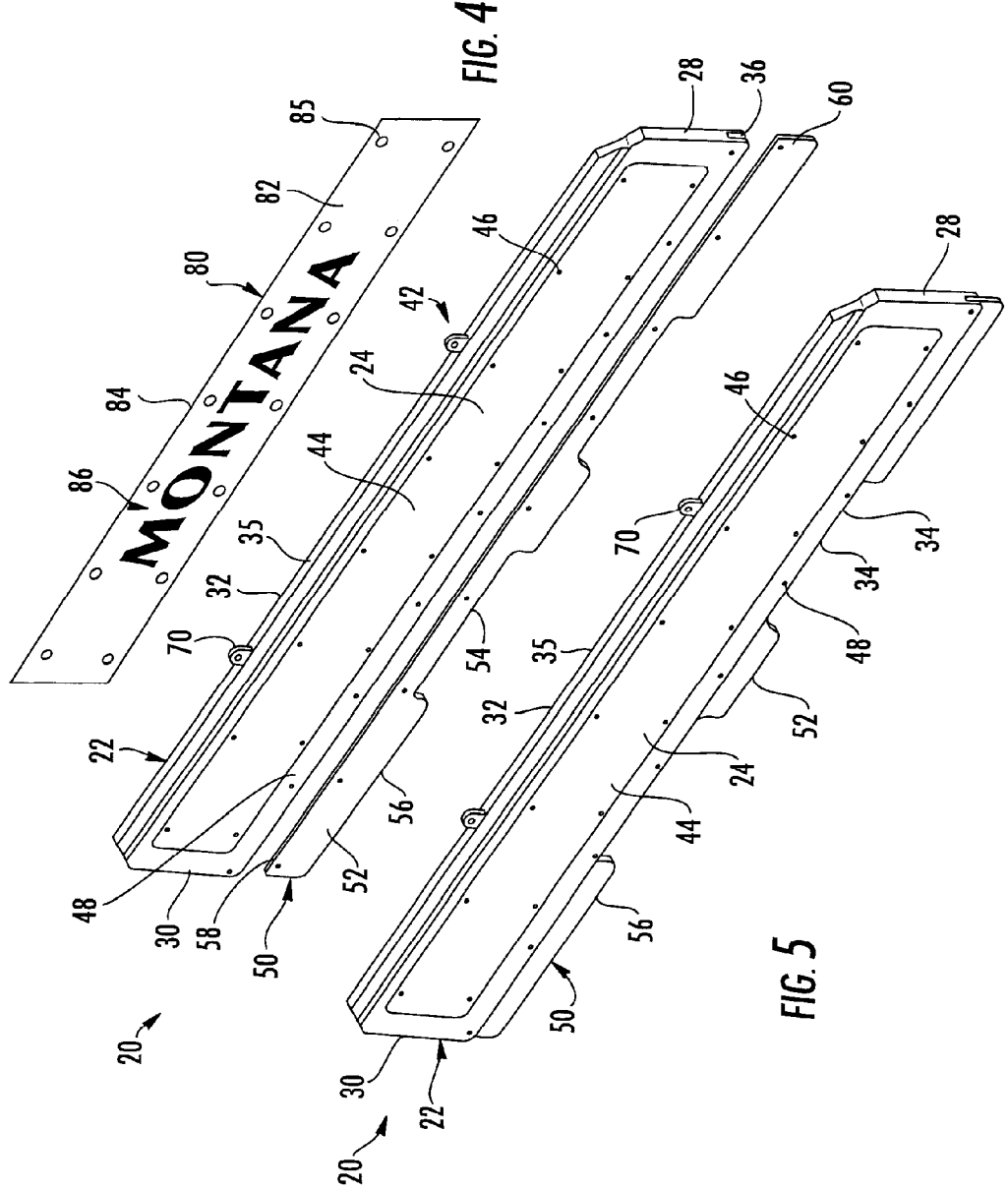

SPLASHGUARD

CROSS REFERENCE TO RELATED APPLICATIONS

The present invention is related to U.S. patent application publication No. 2004/0066028, which is herein incorporated by reference in entirety.

BACKGROUND

1. Field of the Invention

The present invention relates to splashguards used to prevent objects, such as water, mud, rocks, sand, and debris, which may be scattered from a vehicle's tires, from impacting other objects, such as windshields of following vehicles.

2. Description of the Related Art

As a vehicle travels down a road, the vehicle's tires may scatter or disperse water, mud, rocks, sand, debris, and other objects. The faster the vehicle is moving, the faster these objects may be scattered. If these objects impact other vehicles or people, they can cause a significant amount of damage and inconvenience. Therefore, devices have been developed to prevent vehicle tires from scattering objects beyond a vehicle.

Some vehicle owners use splashguards to prevent tire splashes from muddying their vehicles. Typical splashguards cover one wheel on one side of a vehicle. Thus, most vehicles have a pair of splashguards to cover both rear wheels. Examples of these splashguards include those disclosed in Larkin et al. (U.S. Pat. No. 6,179,311), Knoer (U.S. Pat. No. 6,076,842), Burnstein (U.S. application Ser. No. 09/792,713), and Simon (U.S. Pat. No. 6,394,475). Some trucks may have four rear wheels, so they may have four splashguards, such as the splashguards disclosed in Conner (U.S. Pat. No. 3,877,722). The splashguards discussed above are positioned perpendicular to the vehicle's undercarriage, and they define a partial surface between the undercarriage and the road. These splashguards are further positioned adjacent to a tire to cover the front of the tire so that when the tire rotates on moving road elements, such as water, mud, or dirt (hereinafter referred to as "tire splash"), the splashguards prevent tire splashes from moving, dirtying, or damaging objects, such as vehicle portions adjacent to the tire or windshields of following vehicles.

One problem with these known splashguards is that they allow some tire splash to escape, particularly through the area between the vehicle's left and right tires. It is desired that splashguards cover this area.

Splashguards disclosed in Knowles (U.S. Design Patent Des. 192,684) and Podall (Des. 209,044) appear to be made of rectangular material that extends throughout the rear side of the vehicle. While these splashguards appear to be able to control tire splashes being dispersed from the area between the vehicle's tires, they are unable to control tire splashes being dispersed from the area between the road and the bottom edge of the splashguard. It is desired that splashguards cover both the area between the road and the edge of the splashguard and the area between the vehicle's tires.

Splashguards disclosed in Larkin et al. (U.S. Pat. No. 6,179,311), Knoer (U.S. Pat. No. 6,076,842), Burnstein (U.S. application Ser. No. 09/792,713), Simon (U.S. Pat. No. 6,394,475) further appear to be rigidly mounted to a bar. The splashguard disclosed in Rogers (U.S. Design Patent Des. 417,422) appears to be rigidly mounted to a vehicle's bumper. Another problem with these splashguards is that when the surface level of the road the vehicle travels on changes, the splashguards are susceptible to being damaged. When the road level changes, the splashguards may hit the road, and either the splashguards will eventually be detached from their attachment points, or they will physically be damaged due to the impact with the road. It is desirable to add flexibility to these splashguards to allow them to accommodate changing road levels thereby minimizing their exposure to potentially damaging impact.

Another problem with known splashguards described above is that they are subject to wear and damage if they come into contact with a road surface. This can happen if the vehicle is overloaded or if the vehicle travels over an uneven roadway. Typically, the bottom of the splashguard may rub and abrade against the road surface. It is further desired that a splashguard have a way of being protected from abrasive damage from road contact.

SUMMARY

Advantages of One or More Embodiments of the Present Invention

The various embodiments of the present invention may, but do not necessarily, achieve one or more of the following advantages:

control tire splashes better than conventional splashguards;

the ability to substantially cover the area between the vehicle's bumper and the road;

provide a durable splashguard;

provide an aesthetically appealing splashguard;

provide a splashguard that has a replaceable wear surface;

provide a splashguard that is protected from road abrasion;

the ability to allow users to customize their splashguard;

provide a splashguard for use with various vehicle types.

These and other advantages may be realized by reference to the remaining portions of the specification, claims, and abstract.

Brief Description

The present invention comprises a splashguard for use in controlling tire splashes of a vehicle. The splashguard comprises a first plate that is attachable to a vehicle. The first plate being substantially as wide as the distance between the vehicle's rear tires. The first plate can be configured to substantially control tire splashes from a vehicle tire. The first plate has a top and a bottom. An insert is removeably attached to the bottom of the first plate. The insert is adapted to protect the first plate. At least one hanger is mounted to the top of the first plate. The hanger is configured to be attachable to the vehicle.

The present invention further comprises a method of creating a splashguard. The method comprises providing a hanger and molding a first plate around a portion of the hanger. An insert is attached to the first plate. The insert and the first plate form a splashguard assembly that is attached to the vehicle through the hanger.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The embodiments of the present invention are shown in the drawings, wherein:

FIG. 4 is substantially an exploded front perspective view of FIG. 2

FIG. 5 is substantially an assembled front perspective view of FIG. 2.

DESCRIPTION OF THE INVENTION

In the following detailed description, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
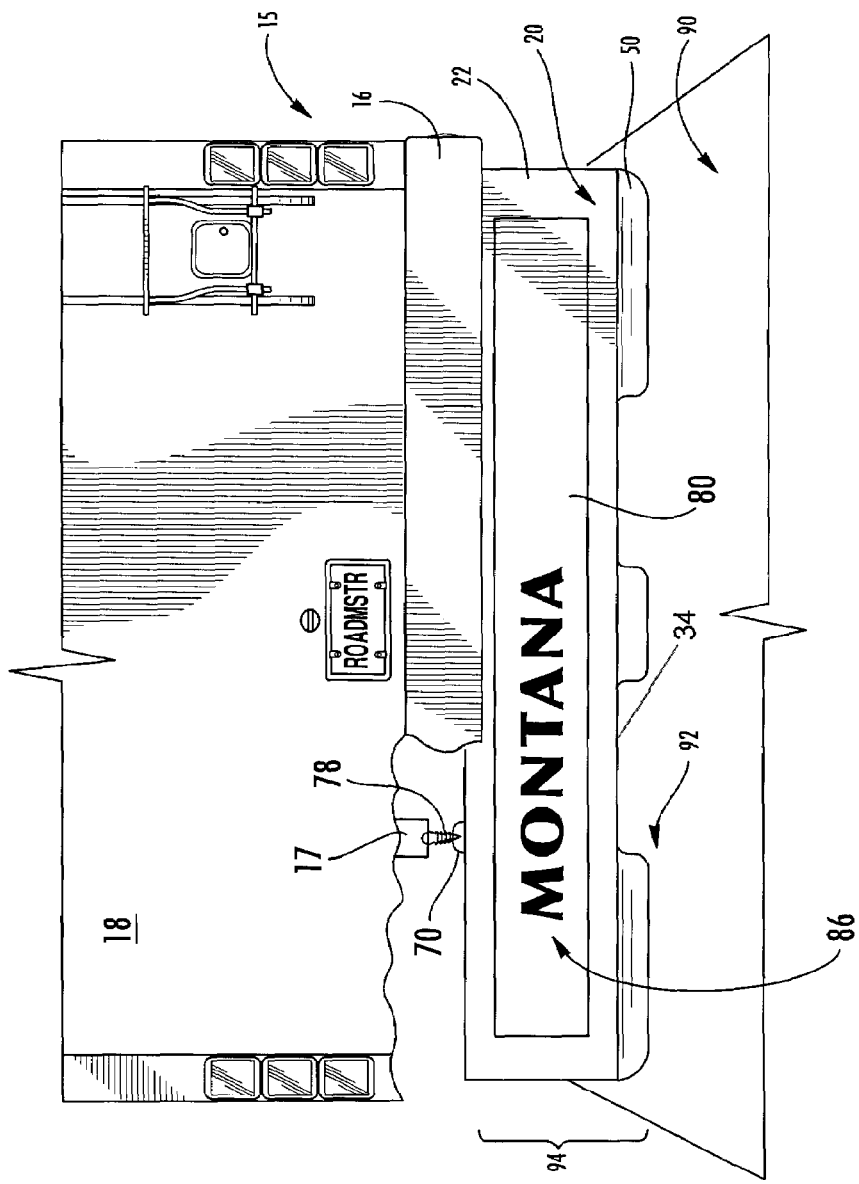
FIG. 1 is substantially a front view of an embodiment of the splashguard of the present invention mounted on a vehicle. A portion of the bumper in FIG. 1 is cut away to show the mounting of the splashguard to the vehicle.

The present invention comprises a splashguard, generally indicated by reference number 20. Referring to FIG. 1, splashguard 20 has a main plate 22. As used herein, the term "plate" generally refers to a substantially flat piece of material. Main plate 22 has a width that is substantially as wide as the width of a vehicle 15. Alternatively, plate 22 may be wide enough to cover one rear wheel (not shown) of vehicle 15. Plate 22 may be made of roto-molded plastic. Other types of plastic molding may also be used such as injection molding, sheet molding and thermoforming. Plate 22 may of course be made of other materials known in the art, such as rubber or steel.

An insert 50 can be positioned and attached at the bottom 34 of plate 22. In this embodiment, insert 50 has a width that is substantially as wide as plate 22. When attached together, plate 22 and insert 50 may form a substantially rectangular shape with a long axis being substantially horizontal (longitudinal) and the short axis (lateral) being substantially vertical. Insert 50 may have a substantially straight lower edge (not shown), or the lower edge may have a variety of curves and fluctuations, an example of which is shown in FIG. 1. Of course, the shapes and dimensions of plate 22 and insert 50 may vary. This specification uses spatially orienting terms such as top, bottom, front, back, rearward, horizontal, etc. It is to be understood these types of terms are for ease of description of various components with respect to one another and do not define absolute orientations in space.

Splashguard 20 has a height that allows splashguard 20 to substantially cover an area 94 between a vehicle bumper 16 and a road 90. Bumper 16 is partially cut away in FIG. 1 to show how splashguard 20 is mounted to vehicle 15. Splashguard 20 may leave a gap 92 between insert 50 and road 90 to keep splashguard 20 away from constant contact with road 30. Splashguard 20 can be mounted at the rear 18 of vehicle 15. Vehicle 15 can have a frame 17. Splashguard 20 may be attached to frame 17 by a fastening mechanism 78. Fastening mechanism 78 can be attached to frame 17 and to hanger 70.

Referring now to FIGS. 2–7, plate 22 can have a hollow interior cavity 21. The hollow interior is a result of the roto-molding process. Plate 22 can have a front side 24, a back side 26, ends 28, 30, a top 32 and a bottom 34. A rib 35 may extend along the top 32. Rib 35 can reinforce plate 22. A slot 36 may be located along bottom 34. The slot may have the same length as plate 22. Slot 36 can define slot walls 37 and 38. Plate 22 has a hanger mounting area 42.

Several reinforcement members 39 may be located in back side 26. Reinforcement members 39 can define a rectangular cavity 40. Reinforcement members 39 are molded into plate 22 during the manufacturing process. The purpose of reinforcement members 39 is to provide structural integrity to plate 22 and to prevent plate 22 from deforming. The number, shapes, orientation, and positions of reinforcement member 39 may vary.

A recess 44 can be located in front side 24. Recess 44 may be molded into plate 22 during the manufacturing process. Holes 46 are located in recess 44. A decorative plate 80 can be mounted in recess 44. Decorative plate 80 has a front side 82 and a back side 84. Back side 84 can be mounted against front side 24. Holes 85 are located in plate 80. Fasteners 88 can be used to attach decorative plate 80 to plate 22. Fasteners 88 can be any suitable fastener such as screws, rivets or bolts and nuts. Decorative plate 80 may contain a symbol 86 such as a name, a mark, a logo, designs, and the like. Decorative plate 80 can be made from a variety of materials such as plastic, rubber, and steel.

Splashguard 20 may have an insert 50 attached to the bottom 34 of plate 22. Insert 50 can have a wide section 52, a thin section 54, a bottom 56 and a top 58. Insert 50 has a width that is substantially as wide as top plate 22. Insert 50 may be mounted in slot 36. The top 58 of insert 50 is located in slot 36 between walls 37 and 38. Apertures 60 are located in insert 50. Fasteners 62 can be used to attach insert 50 to plate 22. Fasteners 62 pass through apertures 48 and 60. Fasteners 62 can be any suitable fastener such as screws, rivets or bolts and nuts. Insert 50 may be made from a variety of materials such as plastic, rubber and steel.

Insert 50 protects plate 22 from wear and damage in the case of splashguard 20 coming into contact with a road surface. Splashguard 20 can contact the road surface if the vehicle is overloaded or if the vehicle travels over an uneven roadway. The bottom 56 of insert 50 would preferentially rub and abrade against the road surface. Since insert 50 can be attached to plate 22 with fasteners, insert 50 is replaceable if it becomes worn or is damaged. Replacing insert 50 is significantly less costly than replacing the entire plate 22. Insert 50 may be formed from a material that resists abrasion or that is robust enough withstand a significant amount of abrasion. A dense rubber material may be suitable for this purpose.

Figure 8:
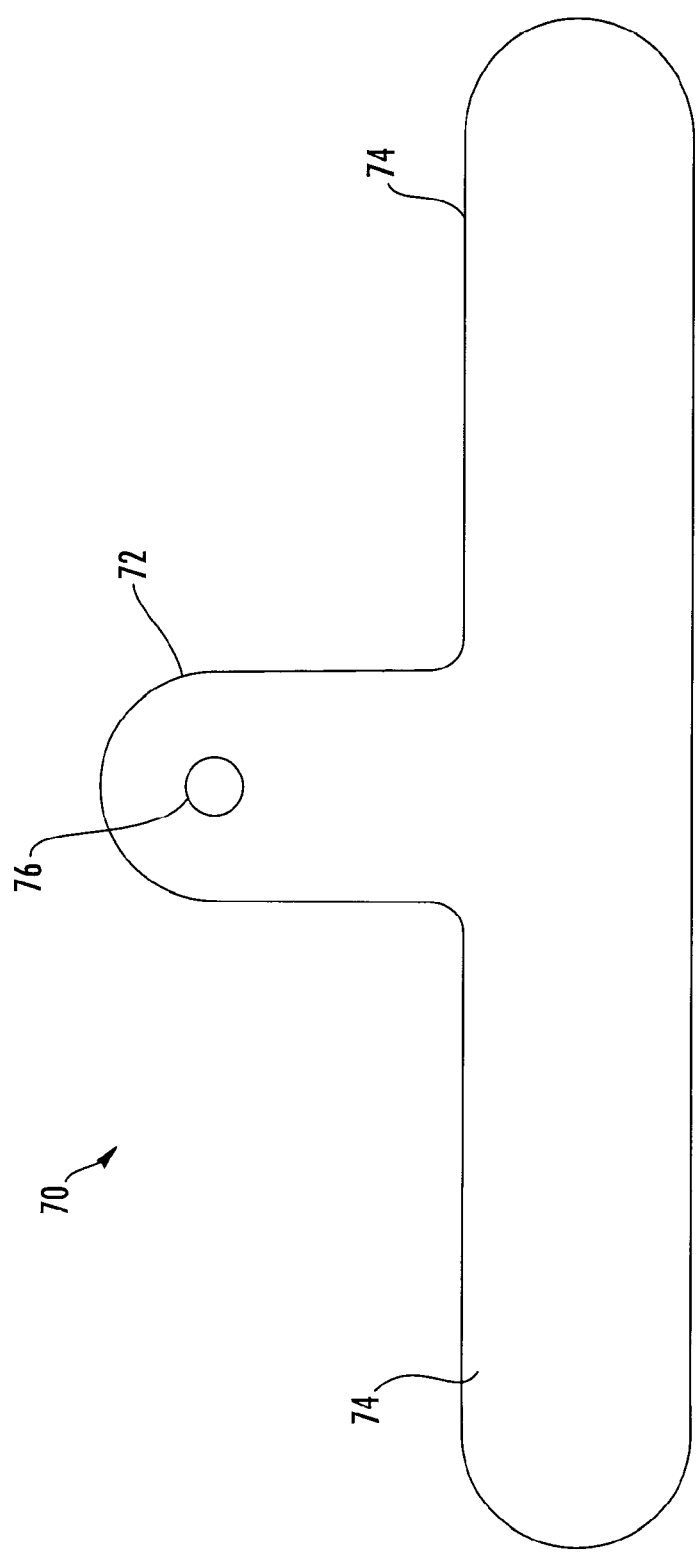
FIG. 8 is substantially a front view of a hanger of the present invention.

Referring now to FIG. 8, an embodiment of a hanger 70 is shown. Hanger 70 may have a T-shape and includes a mounting member 72 and a pair of retaining members 76. Hanger 70 may have an aperture 76 located in mounting member 72. Hanger 70 may have other shapes than that which was shown.

Figures 2, 3:
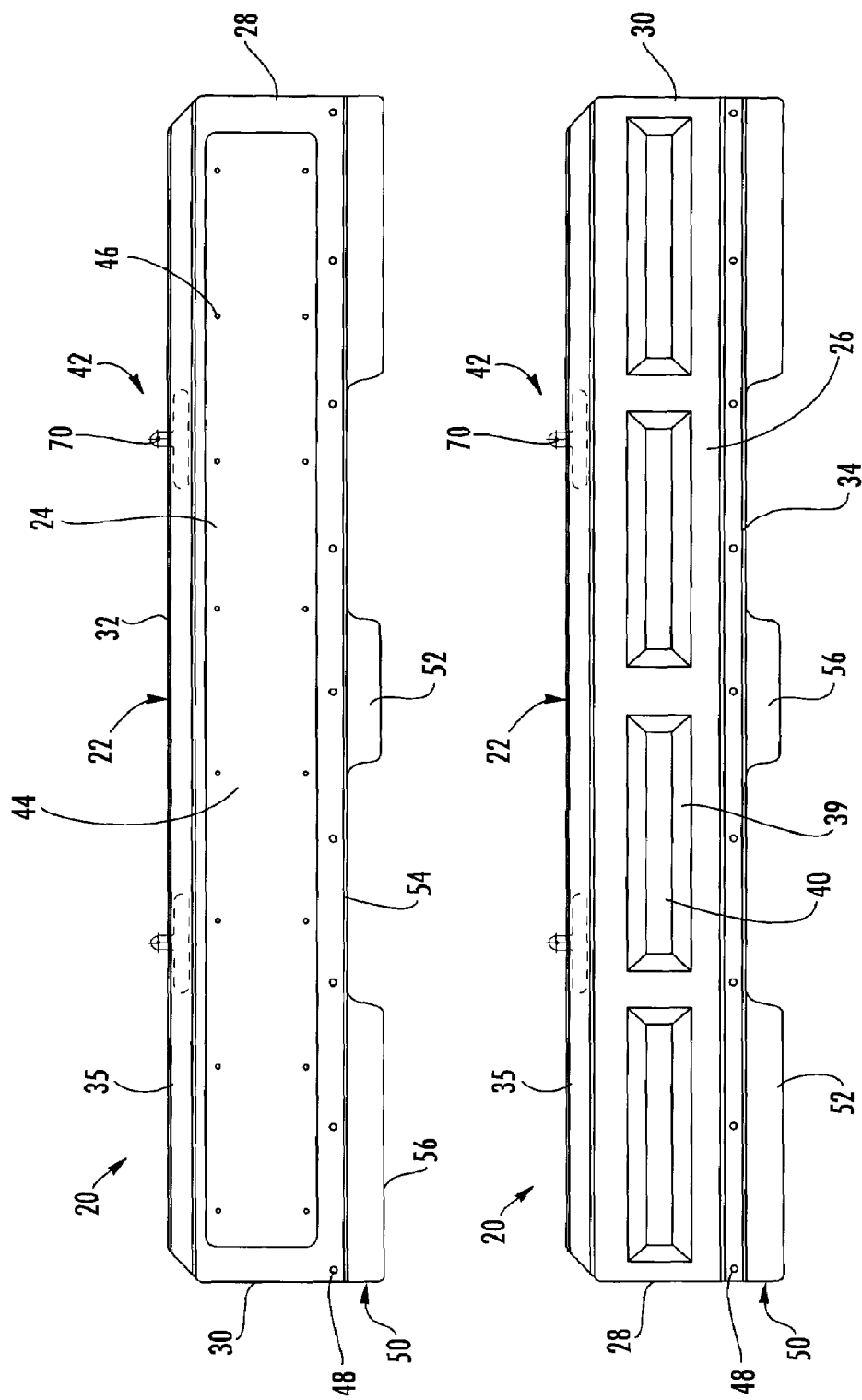
FIG. 2 is substantially a front view of an embodiment of a splashguard of the present invention.
FIG. 3 is substantially a rear view of FIG. 2.
Figure 6:
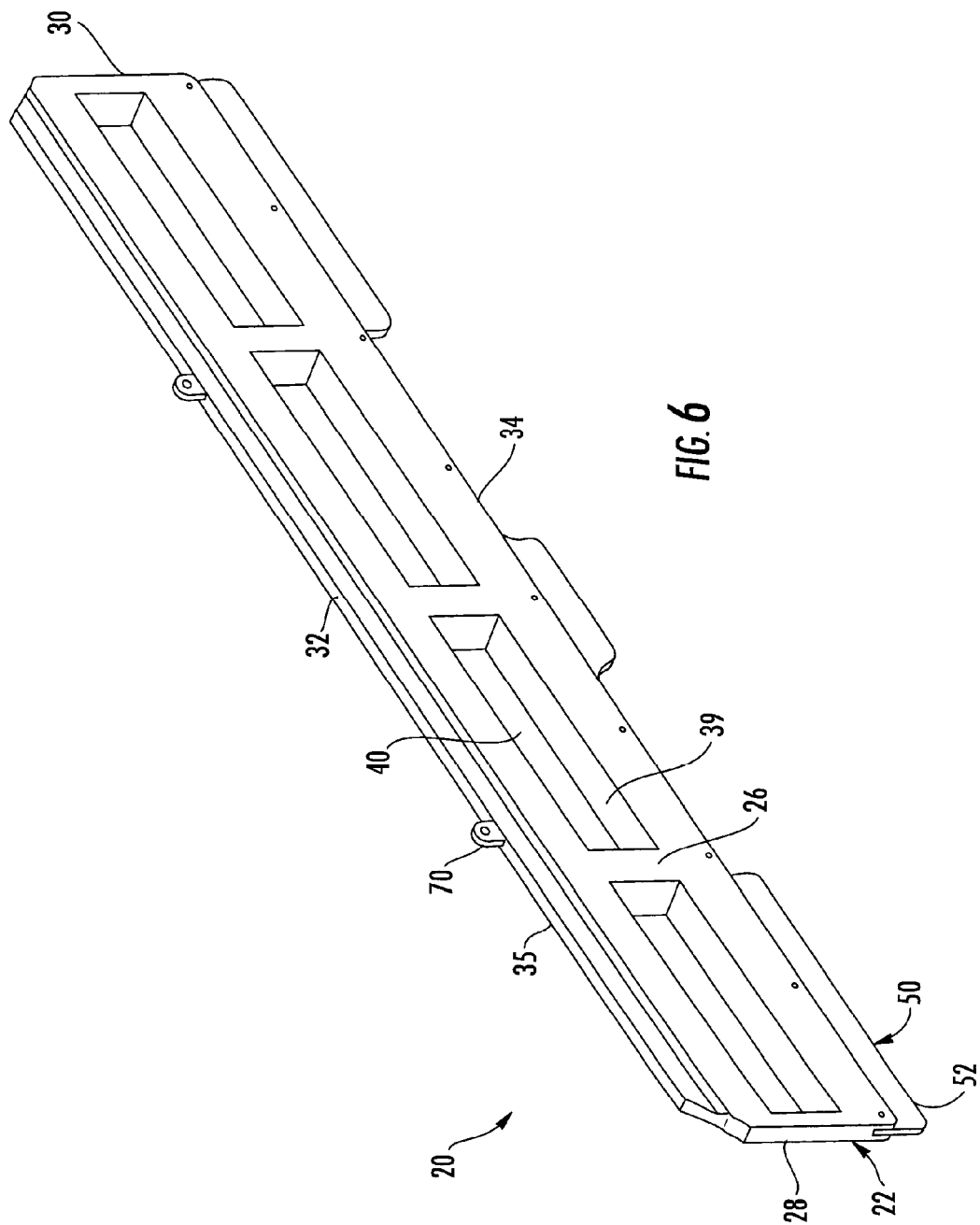
FIG. 6 is substantially a rear perspective view of FIG. 2.
Figure 7:
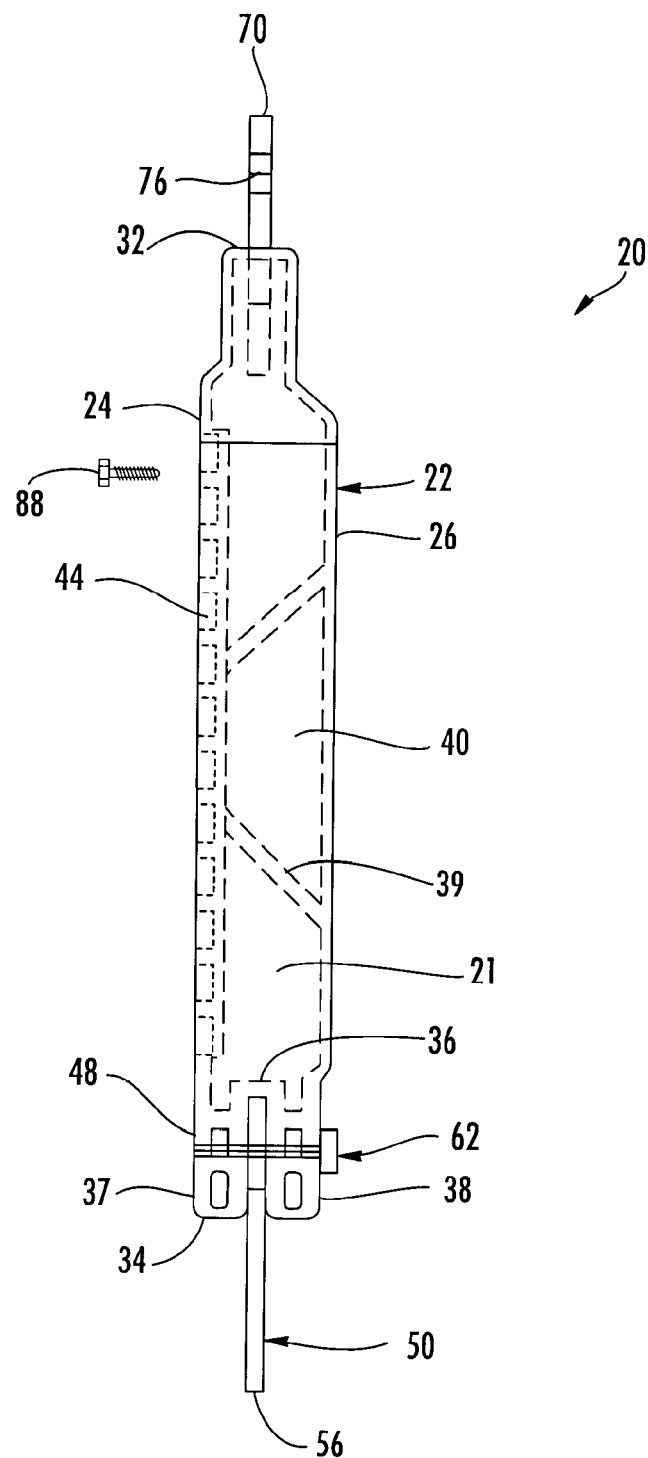
FIG. 7 is substantially a cross-sectional view of the splashguard of FIG. 2 showing in detail the attachment of the insert and the molded hanger.

Referring now to FIGS. 2 and 3, hanger 70 may be mounted partially within plate 22 in the hanger mounting area 42. Hanger 70 can be insert molded into plate 22 during the roto-molding process. Hanger 70 may be partially placed into a mold (not shown) for plate 22. The retaining members 74 may be located in the mold and mounting member 72 is located outside of the mold (see FIG. 8). After the mold is filled with liquid plastic and rotated, it is cooled. The liquid plastic solidifies around retaining members 74, integrally connecting the hanger 70 to plate 22. The hanger 70 is integrally mounted within plate 22. Mounting member 72 can extend away from the top 32 of plate 22.

Turning to FIG. 1, fastening mechanism 78 hingably attaches plate 22 to a frame 17 or undercarriage of a vehicle. Fastening mechanism 78 can be a chain or may be one of many other types of fastening mechanisms such as hinges or bushings. In the case where fastening mechanism 78 is a chain, the chain can be attached to hanger 70 by various methods such as welding, crimping, using U-bolts or using a device such as a carabiner.

It is noted that with fastening mechanism 78, the height of splashguard 20 is flexible to changing road levels, as plate 22 may swing forward and backward thereby adjusting the height of splashguard 20 relative to the road level. The height of splashguard 20 is generally defined by plate 22 and insert 50. In one embodiment, the height of splashguard 20 allows a gap (not shown) in between splashguard 20 and the road. When the road level increases and closes the gap, the road will contact insert 50 and will set plate 22 in motion to partially rotate. As plate 22 rotates, the height of splashguard 20 is shortened.

It can be realized that certain embodiments of the present invention provide a splashguard that is able to protect the splashguard from abrasion and wear thereby allowing the splashguard to handle any potentially damaging impact it may receive when it comes in contact with the road. It can further be realized that in situations when a vehicle pulls forward or backs up on surface that provides low ground clearance, certain embodiments of the present invention provide a vehicle splashguard that is less likely to be damaged or deformed than conventional splashguards. The present invention also provides a splashguard that has a replaceable wear insert. Thus, certain embodiments of the present invention provide both a splashguard that is less susceptible to being damaged and a splashguard that has a replaceable wear insert.

It is noted that splashguards 20 are not limited for use with recreational vehicles. Splashguards 20 may be used with a variety of vehicles, including motorized vehicles, such as sport-utility vehicles, sedans, limousines, trucks, non-motorized vehicles, such as bicycles and trailers, commercial vehicles, non-commercial vehicles, vehicles designed for transporting passengers, vehicles designed for carrying loads, and other vehicles known in the art.

CONCLUSION

It can thus be realized that the certain embodiments of the present invention have better ability to control tire splashes than conventional splashguards. Certain embodiments also have the ability to substantially cover the area between the vehicle's bumper and the road. Certain embodiments are able to provide a splashguard with a replaceable wear surface. Certain embodiments also provide a durable and aesthetically appealing splashguard. Certain embodiments further provide the ability to allow users to customize their splashguard, and certain embodiments of the present invention provide a splashguard that has a replaceable insert that protects the main body of the splashguard from abrasion.

Although the description above contains many specifications, these should not be construed as limiting the scope of the invention but as merely providing illustrations of some of presently embodiments of this invention. Thus, the scope of the invention should be determined by the appended claims and their legal equivalents rather than by the examples given.

What is claimed is:

1. A splashguard for use in controlling vehicle tire splashes, the splashguard comprising:
    (A) a first plate being attachable to a vehicle, the first plate being configured to substantially control tire splashes from a vehicle tire, the first plate being formed from a molded plastic and having a top and a bottom;
    (B) an insert removeably attached to the bottom of the first plate, the insert adapted to protect the first plate; and
    (C) at least one hanger integrally mounted to the top of the first plate, the hanger being configured to be attachable to the vehicle, and wherein at least a portion of the hanger is molded into the first plate.

2. The splashguard of claim 1, further comprising at least one reinforcement member integral with the first plate, the reinforcement member being configured to provide rigidity to the first plate.

3. The splashguard of claim 1, wherein the reinforcement member defines a cavity.

4. The splashguard of claim 1, wherein a slot is located in the bottom of the first plate.

5. The splashguard of claim 1, wherein the insert is mounted in the slot.

6. The splashguard of claim 1, wherein at least one fastener attaches the insert to the first plate.

7. The splashguard of claim 1, wherein a recess is located in the first plate.

8. The splashguard of claim 7, wherein a second plate is mounted in the recess.

9. The splashguard of claim 1, wherein the hanger has a mounting member and at least one retaining member.

10. The splashguard of claim 9, wherein an aperture is located in the mounting member.

11. A splashguard for use in controlling tire splashes of a vehicle, the splashguard comprising:
    (A) a first plate configured to substantially control tire splashes from the vehicle's tire;
    (B) a hanger attached to the first plate, the hanger adapted to be attached to the vehicle wherein the hanger is insert molded into the first plate; and
    (C) an insert attached to the first plate, whereby the insert is adapted to preferentially wear when a road surface contacts the insert.

12. The splashguard of claim 11, wherein the first plate and the insert are substantially as wide as the distance between the vehicle's rear tires.

13. The splashguard of claim 11, further comprising a reinforcement member located in the first plate, the reinforcement member being configured to structurally reinforce the first plate.

14. The splashguard of claim 11, wherein a removable second plate is mounted to the first plate.

15. The splashguard of claim 11, wherein a slot is located in the first plate, the insert mounted in the slot.

* * * * *